(12) United States Patent
Horstmann et al.

(10) Patent No.: US 6,649,035 B2
(45) Date of Patent: Nov. 18, 2003

(54) LOW ENERGY AND NON-HEAT TRANSFERRING CRUST BREAKING SYSTEM

(75) Inventors: Theodor H. Horstmann, Wilmington, DE (US); Joseph E. Foster, Jr., Sterling Heights, MI (US); Neil E. Russell, Bloomfield Hills, MI (US)

(73) Assignee: Ross Operating Valve Company, Troy, MI (US)

( * ) Notice: Subject to any disclaimer, the term of this patent is extended or adjusted under 35 U.S.C. 154(b) by 337 days.

(21) Appl. No.: 09/849,949

(22) Filed: May 4, 2001

(65) Prior Publication Data

US 2002/0170819 A1 Nov. 21, 2002

(51) Int. Cl.[7] .................................................. C25C 3/00
(52) U.S. Cl. ......................................... 204/245; 266/78
(58) Field of Search ........................... 204/245; 91/426, 91/446, 448, 468; 266/78

(56) References Cited

U.S. PATENT DOCUMENTS

| | | |
|---|---|---|
| 2,456,236 A | 12/1948 | Acton |
| 2,743,704 A | 5/1956 | Banker |
| 3,253,516 A | 5/1966 | Huntington et al. |
| 3,272,086 A | 9/1966 | Soeters |
| 3,371,026 A | 2/1968 | Kiley et al. |
| 3,568,570 A | 3/1971 | Winders |
| 3,664,946 A | 5/1972 | Schaper et al. |
| 3,670,628 A | 6/1972 | Borer et al. |
| 3,943,972 A | 3/1976 | Bitonti et al. |
| 4,053,384 A | 10/1977 | Siegmund |
| 4,321,115 A | 3/1982 | Rebmann et al. |
| 4,407,150 A | 10/1983 | Kelly |
| 4,493,244 A | 1/1985 | Stillfried et al. |
| 4,523,513 A | 6/1985 | Gudat et al. |
| 4,563,255 A * | 1/1986 | Heinzmann et al. ........ 204/245 |
| 4,617,100 A | 10/1986 | Boughton |
| 4,700,610 A | 10/1987 | Bauer et al. |
| 4,700,612 A | 10/1987 | Pfister |
| 4,858,937 A | 8/1989 | Fairlie-Clarke et al. |
| 5,163,353 A | 11/1992 | Horstmann et al. |
| 5,237,905 A | 8/1993 | Kuttruf |
| 5,405,506 A | 4/1995 | Kumpulainen |
| 5,476,574 A | 12/1995 | Welch et al. |
| 5,778,753 A | 7/1998 | Higgins |
| 5,914,023 A | 6/1999 | Roy et al. |
| 6,436,270 B1 * | 8/2002 | Sander ........................ 205/336 |

FOREIGN PATENT DOCUMENTS

| | | |
|---|---|---|
| AU | A-21551/88 | 3/1989 |
| AU | B-24006/95 | 3/1997 |

(List continued on next page.)

OTHER PUBLICATIONS

"Air Fingers Pick Up and Deliver", Ross Enginair, vol. 4, No. 5, May–Jun., 1959.
"Air In Foundries", Ross Enginair, vol. 4, No. 1, Sep.–Oct., 1958.

(List continued on next page.)

*Primary Examiner*—Scott Kastler
(74) *Attorney, Agent, or Firm*—Harness, Dickey & Pierce

(57) ABSTRACT

A pneumatic control system is provided for selectively controlling movement of a pneumatically-operated device between first and second working positions. The pneumatically-operated device includes a working portion and a pneumatic-control portion. The pneumatic-control portion is in fluid communication with a pressurized fluid source and includes a series of valves for selectively manipulating the working portion between the first and second working positions. The pneumatic-control portion further includes a sensing system for holding the working portion in a static mode by selectively applying system pressure to the working portion. In this manner, a more energy efficient system is provided by eliminating the need for continuous application of full line pressure.

27 Claims, 4 Drawing Sheets

FOREIGN PATENT DOCUMENTS

| | | |
|---|---|---|
| DE | 26 29 564 A1 | 1/1978 |
| DE | 28 50 237 A1 | 5/1980 |
| DE | 30 22 490 A1 | 12/1981 |
| EP | 0 124 480 A1 | 11/1984 |
| FR | 994333 | 11/1951 |
| GB | 688440 | 3/1953 |
| GB | 741256 | 11/1955 |
| GB | 2 1 88 984 A | 10/1987 |
| JP | 4-29602 | 1/1992 |
| WO | WO 96/02764 | 2/1996 |

OTHER PUBLICATIONS

"Air Replaces Muscle in Tire Mounting Line", Ross Enginair, vol. 4, No. 6, Jul.–Aug., 1959.

"Air Sets Stator Screws Automatically", Ross Enginair, vol. 2, No. 5, May–Jun. 1957.

"Air Squeezes Air From Fibrous Insulation", Ross Enginair, vol. 5, No. 1, Sep.–Oct., 1959.

"All Air Press Circuit Provides Maximum Safety and Increased Versatility", Ross Enginair, vol. 2, No. 2, Nov.–Dec. 1956.

Automatic Welder Uses Air Power for Twenty–two Different Operations, Ross Enginair, vol. 2, No. 1, Sep.–Oct. 1956.

"Big Thinking for Air Powered Assembly Fixture", Ross Enginair, vol. 3, No. 6, Jul.–Aug., 1958.

"COAL—Handling It in English Mines", Ross Enginair, vol. 2, No. 6, Jul.–Aug., 1957.

"Features—Other Vickers T–J Actuator Products", Vickers, Inc., 2 pgs., 1990 (No month).

"Flexibility of Air Permits Multi–Riveting Automation", Ross Enginair, vol. 6, No. 5, May–Jun., 1961.

"Fluid Pressure Mechanisms", H.G. Conway, Sir Isaac Pitman & Sons, Ltd., London, 1949 No month.

"Heavy Duty Air Cylinders Pre–Lubcriated", Hennells HA Series, 5 pgs. (No date).

"Heavy Work Handling Modernized by Air", Ross Enginair, vol. 6, Mar.–Apr., 1961, No. 4.

"How to Do 10 Operations in 5 Seconds—With Air", Ross Enginair, vol. 5, No. 5, May–Jun., 1990.

"Indicator Switch", Hydro–Line Manufacturing Company, 2 pgs., 1981. No month.

"Intelligent Crust Breaker", Parker Hannifin AB, TMS 2000 Annual Meeting & Exhibition, 4 pgs., 2000 No month.

"Metric Compact Air Cylinders", Compact Air Products, Inc., 3 pgs. No date.

"Parker Cylinders Designed For High Water Base Fluids", Cylinder Innovations, Parker Hannifin Corporation, Bulletin 1110–B1, 2 pgs., Mar. 1, 1981.

"Part 2 Air for the Kingdom of Metal", Ross Enginair, vol. 3, No. 5, May–Jun., 1958.

"Part I Air for the Kingdom of Metal", Ross Enginair, vol. 3, No. 4, Mar.–Apr., 1958.

Pins Faced, Anyone?, Ross Enginair, vol. 4, No. 4, Mar.–Apr., 1959.

"TP Cylinder Features", Vickers, Inc., 2 pgs., 1990. (No month).

"Varied Multi–Assembly Simultaneously by Air", Ross Enginair, vol. 6, No. 2, Nov.–Dec., 1960.

"Wood Boring Production Tripled Pneumatically", Ross Enginair, vol. 7, No. 1, Sep.–Oct., 1961.

"Pneumatic Capping Machine Drastically Reduces Rejects", Ross Enginair, vol. 7, No. 5, Oct.–Nov.–Dec., 1962.

Ross Enginair, vol. 3, No. 2, Nov.–Dec. 1957.

Sheffer Mechanical, "Limit Switch Actuators", 7 pages, No date.

* cited by examiner

LOW ENERGY AND NON-HEAT TRANSFERRING CRUST BREAKING SYSTEM

FIELD OF THE INVENTION

The present invention relates to pneumatically actuated devices and more particularly to a crust-breaking device for use in processing molten material.

BACKGROUND OF THE INVENTION

Pneumatic control valves or control valve systems are commonly used in various operations or processes for controlling the flow of pressurized control air to and from a pneumatically-operated cylinder or other such actuating device having a movable work-performing member or armature. Frequently, however, the pneumatically-operated device is not constantly in motion, with the work-performing member being held in a stationary position during various portions of the operation. The maintaining of full line control air pressure during periods when the movable armature of the pneumatically-operated device is required to be held in a stationary position has been found to be wasteful of energy required to run compressors or other such devices.

In many pneumatically-operated systems, especially in systems employing older equipment, leakage inevitably occurs in the pneumatically-operated device or in related systems or subsystems. The maintaining of full line control air pressure and flow in order to compensate for such leakage has also been found to be expensive and wasteful in terms of energy usage, especially in systems such as those described above where a movable armature is required to be held in a stationary position during various portions of the operation of the system.

Such pneumatically-operated devices are commonly employed in systems that process molten metal. Typical processing systems include a large receptacle for retaining a mass of molten metal therein. A surface of the mass is generally exposed to atmosphere and thus exothermic heat transfer occurs from the mass, thereby cooling the top surface of the mass and forming a crust. The crust formation is detrimental to the material processing and pneumatically-operated devices, such as that described herein, are commonly employed for intermittently breaking the crust. However, it has been recognized in the industry that contact between the pneumatically-operated devices and the mass results in heat transfer from the mass to the pneumatically-operated devices. This has been found to be detrimental to energy efficiency in the processing of molten metals because the addition of heat is required to compensate for that lost through the heat transfer.

Thus, the need has arisen for a pneumatic control valve or control valve system that is capable of addressing the above-mentioned problems in a more energy-efficient manner. To this end, in accordance with the present invention, it has been found that a pneumatically-operated cylinder or other such device can be held in a stationary or static condition with minimal air pressure. In addition, it has been found that it is not necessary to continuously compensate for leakage in the pneumatically-operated system or device, especially during the above-mentioned static modes of operation. Instead, a brief, instantaneous compensation of air pressure may be used to maintain the pneumatically operated system or device in the static modes of operation. Further, and in accordance with the present invention, the effects of heat transfer may be significantly reduced by limiting the time the pneumatically-operated device and the mass remain in contact with one another during a crust breaking process.

SUMMARY OF THE INVENTION

Accordingly, the present invention provides a control system for selectively controlling movement of a device between first and second working positions. The control system comprises a control actuator selectively actuated to enable fluid communication between the control system and a source of pressurized fluid, a driving system for selectively driving the device between the first and second working positions in response to the control actuator enabling fluid communication between the control system and the source of pressurized fluid, a sensing system for identifying either of the first and second working positions of the device and manipulating a flow of pressurized fluid to the device in response thereto, and a monitoring actuator selectively actuated by the sensing system for relieving the flow of pressurized fluid to the driving system, wherein the monitoring actuator remains actuated until the control actuator is deactuated.

The present invention further provides a system for processing molten material. The system includes a retainer for retaining a mass of molten metal wherein said mass of molten metal periodically forms a crust on a top surface, a device operable between first and second working positions for selectively breaking the crust, and a control system for controlling operation of the device between the first and second working positions. The control system includes a control actuator selectively actuated to enable fluid communication between the device and a source of pressurized fluid, a driving system for selectively driving the device between the first and second working positions in response to the control actuator enabling fluid communication between the device and the source of pressurized fluid, a sensing system for identifying either of the first and second working positions of the device and manipulating a flow of pressurized fluid to the device in response thereto, and a monitoring actuator selectively actuated by the sensing system for relieving the flow of pressurized fluid to the driving system, wherein the monitoring actuator remains actuated until the control actuator is deactuated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
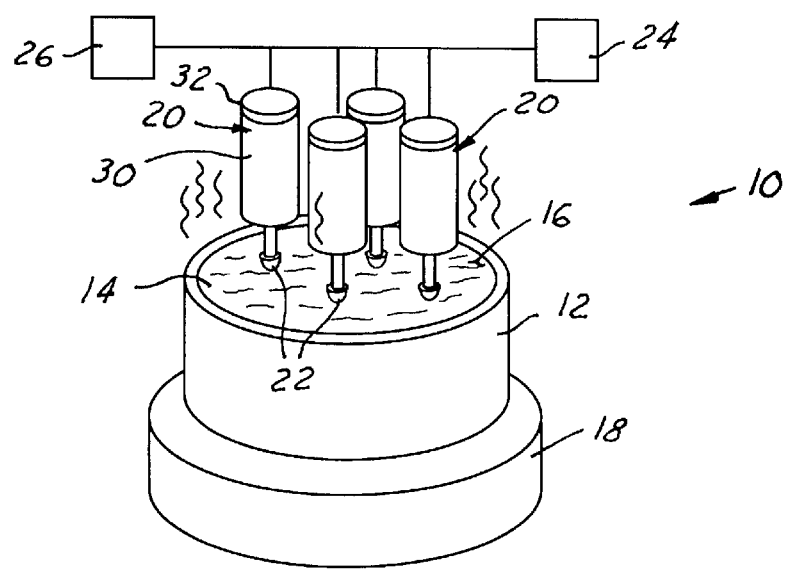
FIG. 1 is a schematic view of a smelting system for processing molten metals, including a crust-breaking device.

With reference to FIG. 1, a system 10 is shown for processing fluid materials, more particularly, molten metal. In an exemplary embodiment, the system 10 operates to process molten aluminum, however, it will be appreciated that any other molten metal or similar material may be substituted therefore. The system 10 includes a pot 12 for retaining a mass 14 of molten metal. A top surface 16 of the mass 14 is open to atmosphere, whereby heat transfer from the mass 14 occurs resulting in a crust forming on the top surface 16. A heat source 18 is included and disposed generally below or around the pot 12 for maintaining the temperature of the mass 14 at or above a liquid transition temperature. The heat source 18 may provide any type of suitable heating, including induction or conduction heating. The liquid transition temperature may vary depending upon the particular material of the mass 14. A plurality of crust-breaking devices 20 are disposed above the pot 12 and selectively engage the top surface 16 of the mass 14 for breaking up a crust, if formed on the top surface 16. The number of crust-breaking devices 20 may vary depending upon the area of the exposed top surface 16. A pick or other breaking tool 22 is fixedly attached to each crust-breaking device 20 for disruptively engaging the crust formed top surface 16 of the mass 14.

The crust-breaking devices 20 are in electrical communication with a controller 24. The controller 24 operates the crust-breaking devices 20 to engage and withdraw from the crust formed top surface 16. Further, the crust-breaking devices 20 are pneumatically-operated and are each in fluid communication with a pressurized fluid source 26. The pressurized fluid source 26 provides a pressurized flow of actuating fluid at a system pressure of approximately 100 psi. In an exemplary embodiment, the actuating fluid is compressed air, however, it will be appreciated that a pressurized hydraulic fluid or the like may be substituted therefor. Further, it will be appreciated that the system pressure of 100 psi is merely exemplary in nature and the system pressure may vary in accordance with design requirements.

The plurality of crust-breaking devices 20 are of the same design and function as one another. Therefore, a single crust-breaking device 20 will be described in detail herein. The crust-breaking device 20 generally includes a working portion 30 and a pneumatic-control portion 32. The pneumatic-control portion 32 interconnects the working portion 30 with the controller 24 and the pressurized fluid source 26. Furthermore, the pneumatic-control portion 32 controls the operation of the working portion 30 in three general modes: static, breaking and return. Each of the three modes is described in further detail hereinbelow.

Figure 2:
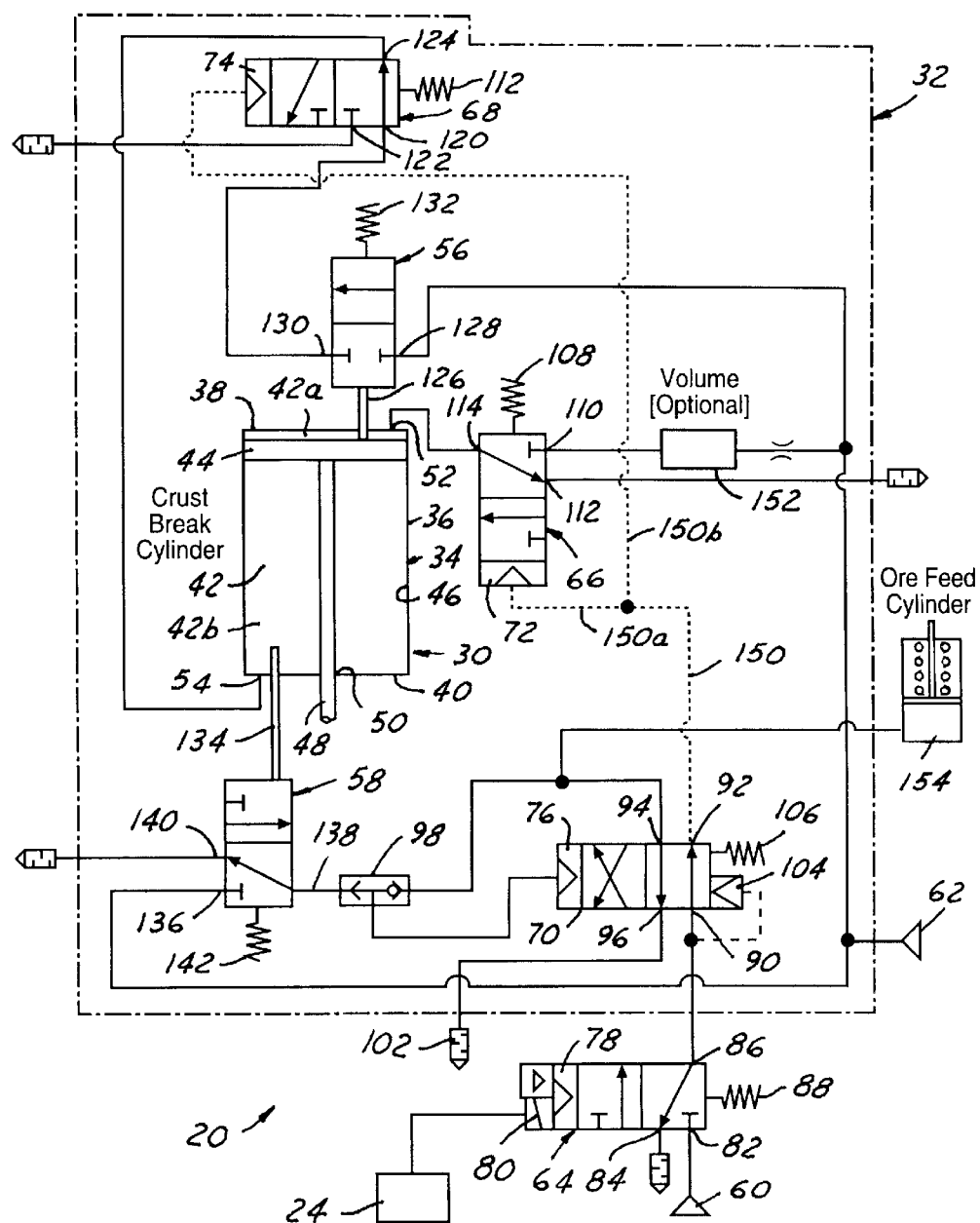
FIG. 2 is a schematic view of a pneumatic valve system configured for operating the crust-breaking device in a static mode.
Figure 3:
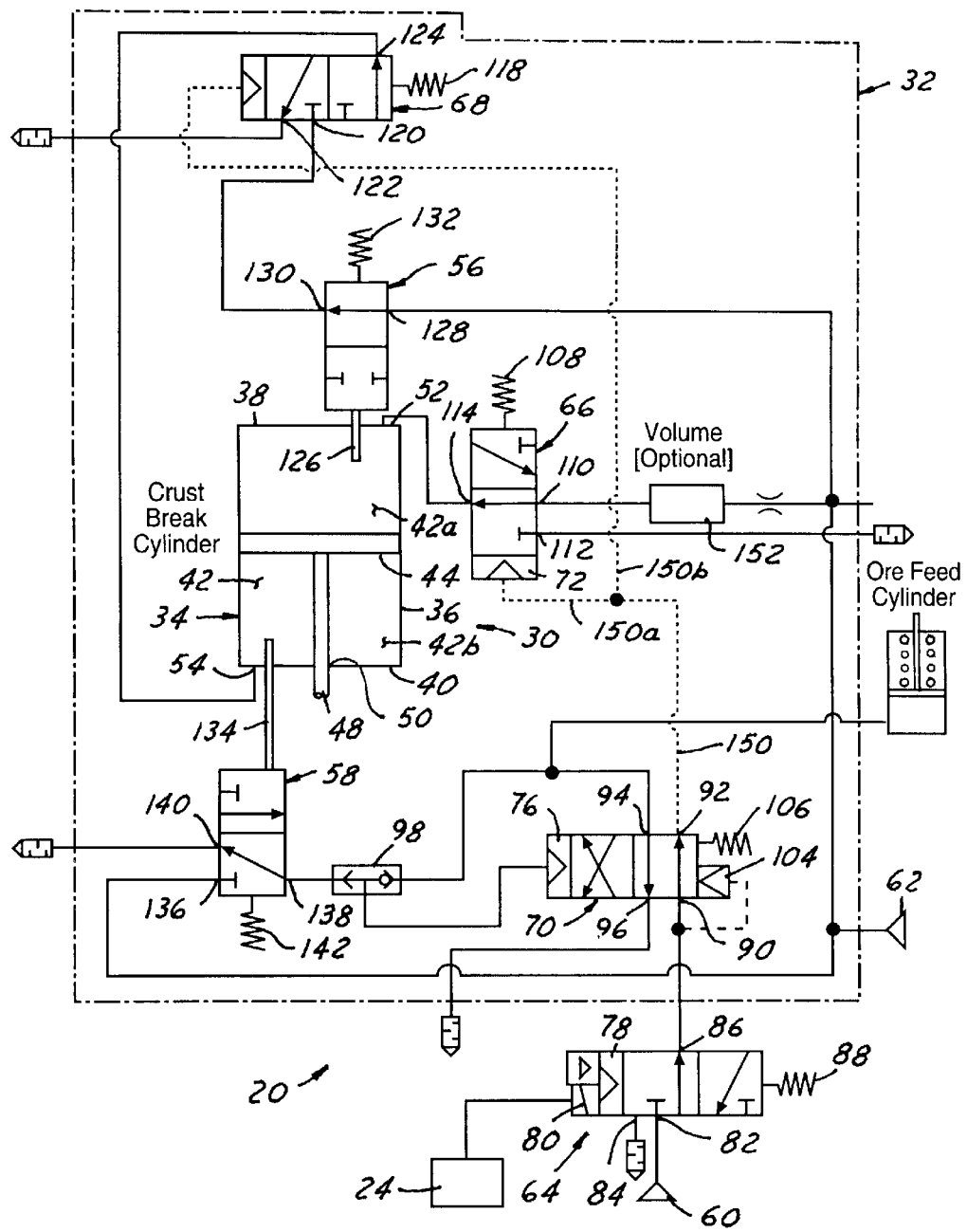
FIG. 3 is a schematic view of the pneumatic valve system of FIG. 2 configured for operating the crust-breaking device in a break mode.
Figure 4:
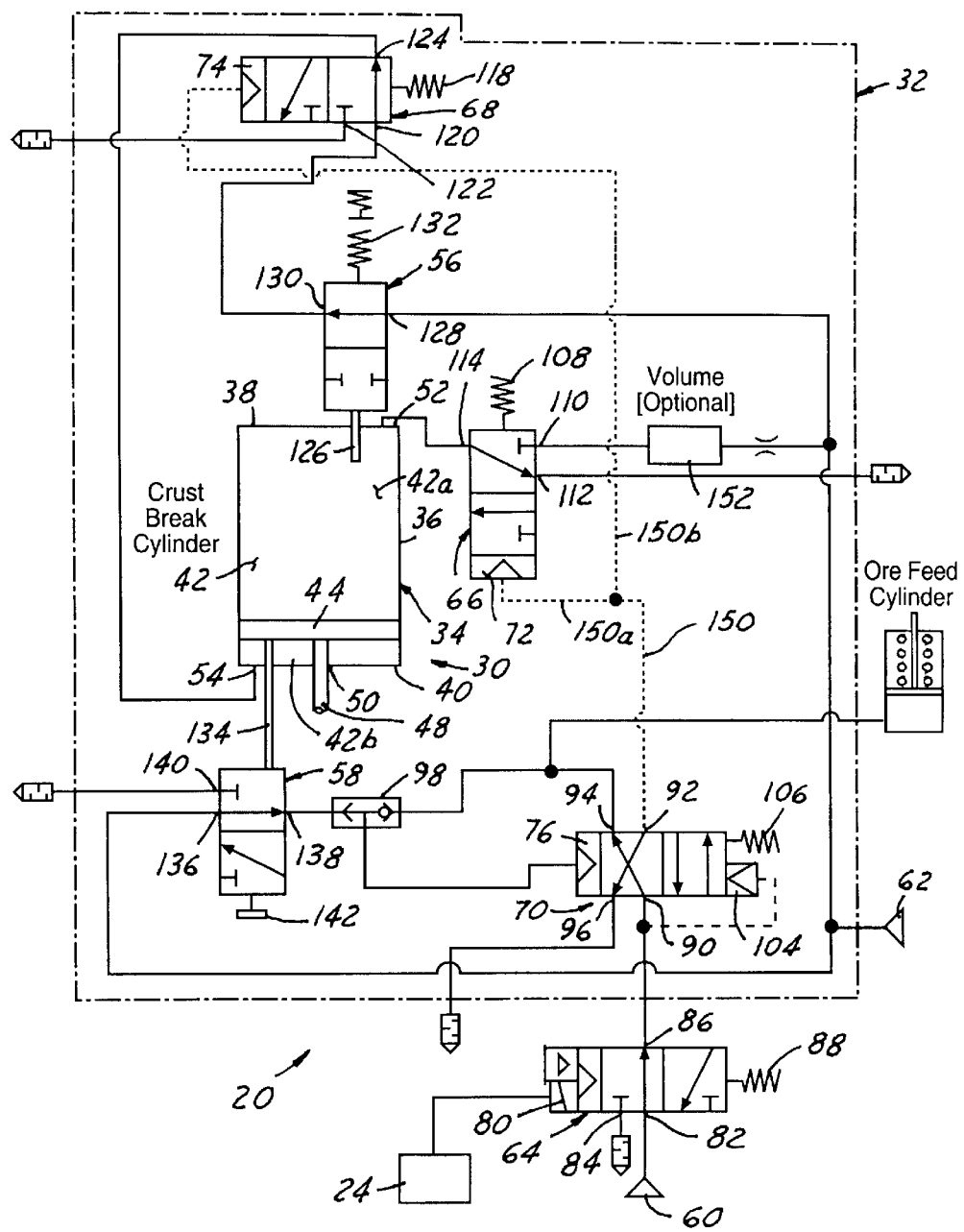
FIG. 4 is a schematic view of the pneumatic valve system of FIG. 2 configured for operating the crust-breaking device in a return mode.

With reference to FIGS. 2–4, the working portion 30 of the crust-breaking device 20 includes a pneumatic cylinder 34 having a cylindrical outer wall 36 and upper and lower end walls 38, 40 defining an internal chamber 42. A piston 44 is slidably disposed within the internal chamber 42 and seals against an internal circumferential surface 46 of the cylindrical outer wall 36. In this manner, the piston 44 divides the internal chamber 42 into upper and lower chambers 42a, 42b. The piston 44 is fixedly attached to a piston rod 48 that is slidably disposed through a central aperture 50 of the lower end wall 40. The piston rod 48 is in sealed sliding engagement with the aperture 50 to prohibit bleeding or leakage of pressurized fluid from the lower chamber 42b. The breaking tool 22 is fixedly attached to the end of the piston rod 48. The upper end wall 38 includes a fluid port 52 for providing pressurized driving fluid to drive the piston 44 downward within the internal chamber 42. The lower end wall 40 includes a fluid port 54 for providing pressurized retracting fluid to retract the piston 44 upward within the internal chamber 42.

The pneumatic control portion 32 of the crust-breaking device 20 includes a series of fluid ports, valves and exhaust ports for operating the working portion in each of the three modes. In the static mode the pneumatic control portion 32 maintains the piston 44 in an upper-most position within the internal chamber 42, whereby the breaking tool 22 is completely retracted from engagement with the crust formed top surface 16 of the mass 14. This is achieved by the lower chamber 42b being filled with the pressurized fluid, having sufficient lifting pressure, and the upper chamber 42a being exhausted of pressurized fluid. If the fluid pressure reduces because of bleeding, and the piston 44 lowers within the internal chamber 42, an upper sensing valve 56 is deactuated directing pressurized fluid into the lower chamber 42b for driving the piston 44 back up, thereby reactuating the upper sensing valve 56 reducing pressurized fluid flow and holding the piston 44 from moving. In the breaking mode, the pressurized fluid is exhausted from the lower chamber 42b through the fluid port 54 of the lower end wall 40 and pressurized fluid is directed into the upper chamber 42a through the fluid port 52 of the upper end wall 38, driving the piston 44 downward within the internal chamber 42. In this manner, the breaking tool 22 is driven into the crust formed top surface 16, thereby breaking up the crust. The return mode is initiated upon the piston 44 approaching the lower end wall 40, thereby actuating a lower sensing valve 58 for exhausting pressurized fluid from the upper chamber 42a, out the fluid port 52, and directing pressurized fluid into the lower chamber 42b through the fluid port 54, thereby driving the piston 44 upward within the internal chamber 42.

The pneumatic control portion 32 of the crust-breaking device 20 includes first and second inlets 60,62 in fluid communication with the pressurized fluid source 26. The first inlet 60 selectively provides pressurized fluid to the hereindescribed components of the pneumatic control portion 32 through an inlet control valve 64. The second inlet 62 provides pressurized fluid directly to the upper sensing valve 56, an upper control valve 66 and the lower sensing valve 58. The upper sensing valve 56 selectively directs the pressurized fluid flow to a lower control valve 68 that further selectively directs the pressurized fluid flow to the lower chamber 42b. The upper control valve 66 selectively directs the pressurized fluid flow to the upper chamber 42a. The inlet control valve 64 selectively directs the pressurized fluid flow of the first inlet 60 through a monitoring valve 70 to pilot ports 72,74 of the upper and lower control valves 66, 68, respectively, for actuating the upper and lower control valves 66,68. The lower sensing valve 58 selectively directs the pressurized fluid flow of the second inlet 62 to a pilot port 76 of the monitoring valve 70 for actuating the monitoring valve 70.

With reference to FIG. 2, the components of the pneumatic control portion 32 will be described in detail to define the static mode of operation of the control portion 32. The inlet control valve 64 is a two-position valve including a solenoid actuated pilot 78 that is selectively actuated by the solenoid 80. The solenoid 80 is in electrical communication with and is actuated by the controller 24. The inlet control valve 64 includes an inlet port 82 that is in direct fluid communication with the first inlet 60 of the pressurized fluid source 26, an exhaust port 84, and an outlet port 86. In the deactuated position, spring 88 biases the inlet control valve 64 to the position shown in FIG. 2, and the inlet port 82 is blocked thereby prohibiting the flow of pressurized fluid therethrough, and the exhaust port 84 is in communication with the outlet port 86. In this manner, any fluid pressure at pilot ports 72, 74 is exhausted to atmosphere through monitoring valve 70. It will be appreciated, however, that the hereindescribed inlet control valve 64 is merely provides an exemplary mechanism for controlling the inlet flow of pressurized fluid.

The monitoring valve 70 includes four ports that are selectively in fluid communication with one another. The first port 90 is in fluid communication with the outlet port 86 of the inlet control valve 64, the second port 92 is in fluid communication with the pilots 72, 74 of the upper and lower control valves 66, 68. The third port 94 is in indirect fluid communication with the pilot port 76 of the monitoring valve 70 through a shuttle valve 98. The fourth port 96 is in fluid communication with an exhaust port 102 to atmosphere. In the deactuated position of FIG. 2, the monitoring valve 70 enables fluid flow between the first and second pilot ports 72, 74 through the inlet control valve 64 to exhaust and fluid communication between the third and fourth ports 94, 96 to exhaust. A second pilot port 104 assists in maintaining the monitoring valve 70 in the deactuated position. The pilot 76 displaces the monitoring valve 70 to an actuated position, as will be described in greater detail herein.

The upper control valve 66 is a two-position valve that includes the pilot port 72, which is in fluid communication with the first inlet 60, as described above. The pilot 72 selectively actuates the upper control valve 66 from a first position to a second position. The upper control valve 66 is biased to the deactuated position by a spring 108 and includes an inlet port 110, an exhaust port 112 and an outlet port 114. The outlet port 114 is in constant fluid communication with the fluid port 52 of the upper end wall 38 and is in selective fluid communication with the inlet and exhaust ports 110,112. The exhaust port 112 is in fluid communication with an exhaust to atmosphere. In the static mode, the upper control valve 66 remains in the first position, whereby the outlet port 114 is in fluid communication with the exhaust port 112. In this manner, the upper chamber 42a of the crust-breaking device 20 is exhausted to atmosphere.

The lower control valve 68 is a two-position valve that includes the pilot port 74 in fluid communication with the inlet control valve 64, as described above. The pilot port 74 selectively displaces the lower control valve 68 from a deactuated position to an actuated position. The lower control valve 68 is biased to the deactuated position by a spring 118 and includes an inlet port 120, an exhaust port 122 and an outlet port 124. The outlet port 124 is in constant fluid communication with the fluid port 54 of the lower end wall 40 and is in selective fluid communication with the inlet and exhaust ports 120, 122. The exhaust port 122 is in fluid communication with an exhaust to atmosphere. The inlet port 120 is in direct fluid communication with the upper sensing valve 56. In the static mode, the lower control valve 68 remains in the deactuated position, whereby the outlet port 124 is in fluid communication with the inlet port 120.

The upper sensing valve 56 is a two-position valve having a mechanical actuator 126 that is in mechanical communication with the piston 44 of the crust-breaking device 20, through the upper end wall 38. The upper sensing valve 56 includes an inlet port 128 and an outlet port 130. The outlet port 130 is in fluid communication with the lower control valve 68 and the inlet port 128 is in fluid communication with the second inlet 62. In an actuated position, the inlet and outlet ports 128, 130 are blocked from each other. Thus, pressurized fluid from the second inlet 62 is prohibited from travelling through the upper sensing valve 56 to the lower control valve 68. In a deactuated position, fluid communication between the inlet and outlet ports 128, 130 is complete, whereby pressurized fluid flows from the second inlet 62 through the upper sensing valve 56, to the lower control valve 68.

More generally, the upper sensing valve 56 supplies air to the lower control valve 68. As the piston 44 returns and contacts the mechanical actuator 126, the upper sensing valve 56 is partially closed. In this manner, the pressure within the lower chamber 42b is regulated by the position of the upper sensing valve 56. The air pressure in the lower chamber 42b is determined by the combined weight of the piston 44, the piston rod 48 and the crust-breaking tool 22. In the event of leakage, the upper sensing valve 56 is partially closed, providing sufficient pressure to support the piston 44 in the upper working position.

In the static mode, piston 44 is disposed upwardly within the chamber 42, the upper sensing valve 56 is biased in the first position by the mechanical actuator 126. In case of system bleeding and dropping of the piston 44 within the chamber 42, the mechanical actuator 126 of the upper sensing valve 56 loses contact with the piston 44 and a spring 132 biases the upper sensing valve 56 toward the deactuated position. In this manner, pressurized fluid passes through the upper sensing valve 56 and the lower control valve 68 into the lower chamber 42b for urging piston 44 upwardly within the chamber 42. When the piston 44 contacts the mechanical actuator 126 to displace upper sensing valve 56 to an actuated position, fluid pressure to the lower control valve 68 is again blocked. Thus, maintaining continuous, full line control pressure and flow is not required to maintain the piston 44 in an upward position, thereby providing a more energy efficient system.

The lower sensing valve 58 is a two-position valve having a mechanical actuator 134 that is in operable communication with the piston 44 of the crust-breaking device 20, through the lower end wall 40. The lower sensing valve 58 includes an inlet port 136, an outlet port 138 and an exhaust port 140. The inlet port 136 is in fluid communication with the second inlet 62, the outlet port 138 is in fluid communication with the pilot port 76 of the monitoring valve 70, through the shuttle valve 98, and the exhaust port 140 is in fluid communication with an exhaust to atmosphere. The outlet port 138 is in selective fluid communication with the inlet and exhaust ports 136,140.

In the static mode, the lower sensing valve 58 is biased to a deactuated position by a spring 142, whereby the outlet port 138 is in fluid communication with the exhaust port 140 for exhausting the pilot port 76 of the monitoring valve 70 to atmosphere. In the breaking mode, as described in further detail herein, the mechanical actuator 134 selectively biases the lower sensing valve 58 into an actuated position, against the bias of the spring 142. In the actuated position, the exhaust port 140 is blocked and the inlet and outlet ports 136, 138 are in fluid communication with one another.

In the static mode, pressurized fluid that had previously been trapped within the lower chamber 42b, urges the piston 44 to an upper position within the chamber 42, thereby actuating the mechanical actuator 126, displacing the upper sensing valve 56 to the actuated position. If, however, the pressurized fluid within the lower chamber 42b is reduced, thus resulting in dropping of the piston 44, the upper sensing valve 56 is biased by the spring 132 to the deactuated position, freeing the flow of pressurized fluid from the second inlet 62, through the deactuated upper sensing valve 56, through the deactuated lower control valve 68 and into the lower chamber 42b. In this manner, a constant supply of pressurized fluid into the lower chamber 42b is not required, thereby reducing the overall pressurized fluid demand of the crust-breaking device 20.

The controller 24 periodically signals activation of the crust-breaking device 20 in the breaking mode. Signaling of the breaking mode may occur for one of several reasons including a schedule, sensors sensing the condition of the mass 14, or the like. As best shown in FIG. 3, to initiate the breaking mode, the controller 24 signals the solenoid 80 of the control valve 64, which displaces the control valve 64 to an actuated position. In the actuated position, the inlet port 82 is in fluid communication with the outlet port 86 to enable the flow of pressurized fluid from the first inlet 60 through the control valve 64. The pressurized fluid flows through the monitoring valve 70 and through a path 150 that splits into first and second paths 150a, 150b. The pressurized fluid flows through the first path 150a to the pilot port 72 of the upper control valve 66 and through the second path 150b to the pilot port 74 of the lower control valve 68. The pressurized fluid concurrently displaces the upper and lower control valves 66, 68 to their actuated positions.

Displacing the upper control valve 66 to the actuated position blocks the exhaust port 112 and enables fluid communication between the inlet and outlet ports 110, 114. In this manner, pressurized fluid flows from the second inlet 62, through the upper control valve 66 and into the upper chamber 42a, through the fluid port 52. An optional volume source 152 may be included for introducing a stored, pressurized fluid directed through the upper control valve 66 to expedite downward displacement of the piston 44. The pressurized fluid flowing into the upper chamber 42a forces downward travel of the piston 44. Concurrent displacement, of the lower control valve to the actuated position blocks the inlet port 120 and enables fluid communication between the outlet and exhaust ports 122, 124. As the pressurized fluid in the upper chamber 42a the piston 44 falls downward due to gravity and pressurized fluid in the lower chamber 42a is exhausted out the fluid port 54 of the lower end wall 40, through the lower control valve 68 and out to atmosphere. In this manner, the piston 44 is able to fall freely, driving the breaking tool 22 downward into the crust-formed top surface 16, thus breaking up the crust-formed top surface 16. The intake of pressurized fluid into the upper chamber 42a prevents suction action from occurring, which would act to slow the fall of the piston 44. Further, if the gravitational fall of the piston 44 is insufficient for breaking the crust-formed top surface 16, the pressurized air provides added force. It should also be noted that downward travel of the piston 44 deactuates the upper sensing valve 56 to enable pressurized fluid flow to the lower control valve 68 where it is blocked at port 120.

As best seen in FIG. 4, the return mode is initiated by the piston 44 interfacing with the mechanical actuator 134 of the lower sensing valve 58, thus displacing the lower sensing valve 58 to the actuated position. Actuation of the lower sensing valve 58 blocks the exhaust port 140 and enables fluid communication between the inlet and outlet ports 136, 138. In this manner, pressurized fluid flows from the second inlet 62, through the lower sensing valve 58, through the shuttle valve 98, to the pilot port 76 of the monitoring valve 70 to actuate monitoring valve 70. Actuating the monitoring valve 70 enables fluid flow between the first and third ports 90, 94 and the second and fourth ports 92, 96. In this manner, pressurized fluid is directed through the monitoring valve 70 to an ore feed cylinder 154 and to the pilot port 76 of the monitoring valve 70 through the shuttle valve 98. Further, the pressurized fluid applied to the pilot ports 72, 74 of the upper and lower control valves 66, 68 is exhausted through the monitoring valve 70.

With the pressurized fluid exhausted from the pilot ports 72, 74 of the upper and lower control valves 66, 68, the upper and lower control valves 66, 68 are biased into their respective deactuated positions by their respective springs 108, 118. In the deactuated position, the upper control valve 66 blocks the flow of pressurized fluid into the upper chamber 42a and provides an exhaust path for the residual pressurized fluid in the upper chamber 42a. Concurrently, pressurized fluid flows through the upper sensing valve 56, through the lower control valve 68 and into the lower chamber 42b for urging the piston 44 upward within the chamber 42. As the piston 44 travels upward, residual fluid in the upper chamber 42a is exhausted out through the upper control valve 66.

Upward travel of the piston 44 enables the spring 142 to deactuate the lower sensing valve 58. Thus, pressurized fluid flow from the second inlet 62 through the lower sensing valve 58 and to the pilot 76 of the monitoring valve 70 is blocked and pressurized fluid at one input to shuttle valve 98 is exhausted to atmosphere. However, the pilot port 76 of the monitoring valve 70 is not immediately deactuated. Instead, the pressurized fluid flow between the first and third ports 90, 94 of the monitoring valve 70 shifts the shuttle valve 98 and is applied to the pilot port 76 of the monitoring valve 70.

The piston 44 eventually reaches the top of the chamber 42, thereby actuating the upper sensing valve 56 to the first position and modulates pressurized fluid flow through to the lower chamber 42b, as described hereinabove. Thus, the piston 44 is held in the upper position as described in the static mode. As a result of the immediate actuation of the above-described return mode, the breaking tool 22 is exposed to the mass 14 for a limited time. In this manner, heat transfer resulting from exposure of the breaking tool 22 to the mass 14 is significantly reduced, thereby providing a more energy efficient system.

After a predetermined time, the controller 24 deactuates the solenoid 80 and the spring 88 biases the control valve 64 to the deactuated position. In the deactuated position flow of pressurized fluid from the first inlet 60 is blocked and residual pressurized fluid is directed through the control valve 64 to exhaust. Eventually, the residual pressurized fluid can no longer maintain actuation of the monitoring valve 70 against the bias of the spring 106, and the second pilot port 104. Thus, the monitoring valve 70 shifts to the deactuated and the pneumatic-control portion 32 returns the static mode. It should be noted that the monitoring valve 70, with its respective fluid flows, is designed to be part of a holding circuit, whereby deactuation only occurs upon deactuation of the control valve 64.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A control system for selectively controlling movement of a device between first and second working positions, the control system comprising:

a control actuator selectively actuated to enable fluid communication between the control system and a source of pressurized fluid;

a driving system for selectively driving the device between the first and second working positions in response to the control actuator enabling fluid communication between the control system and the source of pressurized fluid;

a sensing system for identifying either of the first and second working positions of the device and manipulating a flow of pressurized fluid to the device in response thereto; and a monitoring actuator selectively actuated by the sensing system for relieving the flow of pressurized fluid to a portion of the driving system, wherein the monitoring actuator remains actuated until the control actuator is deactuated.

2. The control system of claim 1, wherein the driving system comprises:

a first actuator selectively actuated for enabling the flow of pressurized fluid to a first side of the device for driving the device to the first working position; and a second actuator selectively actuated for enabling the flow of pressurized fluid to a second side of the device for driving the device to the second working position.

3. The control system of claim 2, wherein each of the first and second actuators includes a pilot in fluid communication with the monitoring actuator, the monitoring actuator concurrently actuating each of the first and second actuators.

4. The control system of claim 1, wherein said sensing system comprises:

a first sensing actuator in operable communication with the device and selectively actuated by the device for enabling the flow of pressurized fluid to the driving system; and a second sensing actuator in operable communication with the device and selectively actuated by the device for enabling the flow of pressurized fluid to the monitoring actuator for actuating the monitoring actuator.

5. The control system of claim 4, wherein the first sensing actuator is in intermediate fluid communication between the driving system and the source of pressurized fluid.

6. The control system of claim 4, wherein the second sensing actuator is in intermediate fluid communication between the monitoring actuator and the source of pressurized fluid.

7. The control system of claim 4, wherein the first sensing actuator is actuated by the device moving from the first working position, thereby enabling the driving system to return the device to the first working position.

8. The control system of claim 4, wherein the second sensing actuator is immediately actuated when the device achieves the second working position for initiating the driving system to return the device to the first working position.

9. The control system of claim 1, further comprising a controller in operable communication with the control actuator for selectively controlling actuation and deactuation of the control actuator.

10. The control system of claim 1, wherein the sensing system is in intermediate fluid communication between the driving system and the source of pressurized fluid.

11. A system for processing molten metals, comprising:

a vessel for retaining a mass of molten metal wherein said mass of molten metal periodically forms a crust on a top surface;

a device operable between first and second working positions for selectively breaking the crust;

a control system for controlling operation of the device between the first and second working positions, the control system comprising:

a control actuator selectively actuated to enable fluid communication between the device and a source of pressurized fluid;

a driving system for selectively driving the device between the first and second working positions in response to the control actuator enabling fluid communication between the device and the source of pressurized fluid;

a sensing system for identifying either of the first and second working positions of the device and manipulating a flow of pressurized fluid to the device in response thereto; and a monitoring actuator selectively actuated by the sensing system for relieving the flow of pressurized fluid to a portion of the driving system, wherein the monitoring actuator remains actuated until the control actuator is deactuated.

12. The system for processing molten metal of claim 11, wherein the driving system comprises:

a first actuator selectively actuated for enabling the flow of pressurized fluid to a first side of the device for driving the device to the first working position; and a second actuator selectively actuated for enabling the flow of pressurized fluid to a second side of the device for driving the device to the second working position.

13. The system for processing molten metal of claim 12, wherein each of the first and second actuators includes a pilot in fluid communication with the monitoring actuator, the monitoring actuator concurrently actuating each of the first and second actuators.

14. The system for processing molten metal of claim 11, wherein the sensing system comprises:

a first sensing actuator in operable communication with the device and selectively actuated by the device for enabling the flow of pressurized fluid to the driving system; and a second sensing actuator in operable communication with the device and selectively actuated by the device for enabling the flow of pressurized fluid to the monitoring actuator for actuating the monitoring actuator.

15. The system for processing molten metal of claim 14, wherein the first sensing actuator is in intermediate fluid communication between the driving system and the source of pressurized fluid.

16. The system for processing molten metal of claim 14, wherein the second sensing actuator is in intermediate fluid communication between the monitoring actuator and the source of pressurized fluid.

17. The system for processing molten metal of claim 14, wherein the first sensing actuator is actuated by the device moving from the first working position, thereby enabling the driving system to return the device to the first working position.

18. The system for processing molten metal of claim 14, wherein the second sensing actuator is immediately actuated when the device achieves the second working position for initiating the driving system to return the device to the first working position.

19. The system for processing molten metal of claim 11, further comprising a controller in operable communication with the control actuator for selectively controlling actuation and deactuation of the control actuator.

20. The system for processing molten metal of claim 11, wherein the sensing system is in intermediate fluid communication between the driving system and the source of pressurized fluid.

21. A pneumatically-operated device comprising:
   a pneumatic cylinder having a piston slidably disposed therein and movable between first and second working positions;
   a pneumatic control system in fluid communication with first and second chambers of said pneumatic cylinder, said pneumatic control system comprising:
   a control actuator selectively actuated to enable fluid communication between the pneumatic cylinder and a source of pressurized fluid;
   a driving system for selectively driving the piston between the first and second working positions in response to the control actuator enabling fluid communication between the device and the source of pressurized fluid;
   a sensing system for identifying either of the first and second working positions of the piston and manipulating a flow of pressurized fluid to the device in response thereto for retaining the piston in the first working position; and
   a monitoring actuator selectively actuated by the sensing system for relieving the flow of pressurized fluid to a portion of the driving system, wherein the monitoring actuator remains actuated until the control actuator is deactuated.

22. The pneumatically-operated device of claim 21, wherein the driving system comprises:
   a first actuator for controlling a flow of actuating fluid to a first chamber of the pneumatic cylinder for driving the piston in a first direction within the pneumatic cylinder; and
   a second actuator for controlling the flow of actuating fluid to a second chamber of the pneumatic cylinder for driving the piston in a second direction within the pneumatic cylinder.

23. The pneumatically-operated device of claim 21, wherein the sensing system comprises:
   a first sensing actuator in operable communication with the piston and selectively actuated by the piston for enabling the flow of pressurized fluid to the driving system; and
   a second sensing actuator in operable communication with the piston and selectively actuated by the piston for enabling the flow of pressurized fluid to the monitoring actuator for actuating the monitoring actuator.

24. The pneumatically-operated device of claim 23, wherein the first sensing actuator is in intermediate fluid communication between the driving system and the source of pressurized fluid.

25. The pneumatically-operated device of claim 23, wherein the second sensing actuator is in intermediate fluid communication between the monitoring actuator and the source of pressurized fluid.

26. The pneumatically-operated device of claim 23, wherein the first sensing actuator is actuated by the device moving from the first working position, thereby enabling the driving system to return the device to the first working position.

27. The pneumatically-operated device of claim 23, wherein the second sensing actuator is immediately actuated when the device achieves the second working position for initiating the driving system to return the device to the first working position.

* * * * *